United States Patent [19]
Shigeno et al.

[11] Patent Number: 5,830,542
[45] Date of Patent: Nov. 3, 1998

[54] REFLECTIVE GUEST-HOST LIQUID-CRYSTAL DISPLAY

[75] Inventors: Nobuyuki Shigeno; Hideo Kataoka; Tetsuo Urabe, all of Kanagawa, Japan

[73] Assignee: Sony Corporation, Tokyo, Japan

[21] Appl. No.: 891,732

[22] Filed: Jul. 14, 1997

[30] Foreign Application Priority Data

Jul. 15, 1996 [JP] Japan ................................ 8-204250
Sep. 30, 1996 [JP] Japan ................................ 8-279951

[51] Int. Cl.⁶ .................................................. G02F 1/1335
[52] U.S. Cl. ................................................ 428/1; 349/122
[58] Field of Search ................................ 428/1; 349/122

*Primary Examiner*—Alexander Thomas
*Attorney, Agent, or Firm*—Hill & Simpson

[57] ABSTRACT

A reflective guest-host liquid-crystal display of the present invention includes a pair of substrates joined together at a predetermined distance therebetween. One of the substrates is positioned at an incident side and the other is positioned at a reflection side. A guest-host liquid-crystal layer, a reflective layer, and a λ/4 phase shifter are provided within a space formed between the pair of substrates. The guest-host liquid-crystal layer positioned adjacent to the incident-side substrate contains a dichroic dye. The λ/4 phase shifter is provided between the guest-host liquid-crystal layer and the reflective layer and is located adjacent to the reflection-side substrate. A counter electrode and pixel electrodes are formed on the incident-side substrate and the reflection-side substrate, respectively, so as to apply a voltage to the guest-host liquid-crystal layer. The λ/4 phase shifter is composed of a uniaxially aligned side-chain type liquid-crystal polymer having at least a biphenyl benzoate group introduced into a side chain, and thereby exhibits improved solvent resistance.

10 Claims, 7 Drawing Sheets

ALIGNMENT DIRECTION

REFLECTIVE GUEST-HOST LIQUID-CRYSTAL DISPLAY

BACKGROUND OF THE INVENTION

1. Field of the Invention

The present invention relates to a reflective guest-host liquid-crystal display. Particularly, the present invention relates to a reflective guest-host liquid-crystal display whose utility efficiency of the incident light is improved by providing a λ/4 phase shifter (quarter-wavelength plate) and a reflective layer within the display. More particularly, the present invention relates to a composition of a liquid-crystal polymer composing the λ/4 phase shifter.

2. Description of the Related Art

FIG. 6 is a cross-sectional diagram showing a basic structure of a reflective guest-host liquid-crystal display disclosed in Japanese Patent Laid-Open No. 6-222351. A reflective guest-host liquid-crystal display 101 shown in the figure includes: a pair of upper and lower substrates 102 and 103; a guest-host liquid-crystal layer 104, a dichroic dye 105; transparent electrodes 106 and 110, a pair of upper and lower alignment films 107 and 111, a reflective layer 108, and a λ/4 phase shifter 109. The pair of upper and lower substrates 102 and 103 are composed of an insulating material such as glass, quartz, or plastic. At least the upper substrate 102 is transparent. The guest-host liquid-crystal layer 104 containing the dichroic dye 105 is held in a space formed between the pair of substrates 102 and 103. The guest-host liquid-crystal layer 104 essentially consists of nematic liquid-crystal molecules 104a. The dichroic dye 105 is a so-called p-type dye having a transition dipole moment substantially parallel to the major axis of the liquid-crystal molecules 104a. Although not shown in the figure, switching devices are formed on the inner surface of the upper substrate 102. The transparent electrode 106 is formed into a matrix pattern to form pixel electrodes and driven by the corresponding switching devices. Furthermore, an inner surface 102a of the upper substrate 102 is covered with the alignment film 107 made of a polyimide resin or the like. The surface of the alignment film 107 is rubbed to homogeneously align the nematic liquid-crystal molecules 104a, in other words, the liquid-crystal molecules 104a are aligned such that their major axis is parallel to the substrate surface. Meanwhile, on the inner surface 103a of the lower substrate 103, a reflective layer 108 made of aluminum, etc. and the λ/4 phase shifter 109 are formed in that order. The λ/4 phase shifter 109 is, for example, composed of a uniaxially aligned liquid-crystal polymer. Moreover, the transparent electrode 110 and the alignment film 111 are provided on the surface of the λ/4 phase shifter 109 in that order. The alignment film 111 is made of a polyimide resin, etc. and subjected to rubbing, as is similar to the opposed alignment film 107.

Operation for displaying an image in the black and white mode in the above-described reflective guest-host liquid-crystal display 101 will be briefly explained below: Under no applied-voltage, the liquid-crystal molecules 104a, as well as the dichroic dye 105, are aligned parallel to the rubbing direction of the alignment films 107 and 111. When light coming from the side of the upper substrate 102 enters into the guest-host liquid-crystal layer 104, the dichroic dye 105 absorbs a light component whose oscillation face is parallel to the major axis of the dichroic dye 105. In addition, a light component whose oscillation face is perpendicular to the major axis of the dichroic dye 105 is transmitted through the guest-host liquid-crystal 104, circularly polarized by the λ/4 phase shifter 109 formed on the surface 103a of the lower substrate 103, and reflected by the reflective layer 108. The polarization direction of the light component is thereby reversed, and the reflected light component is re-transmitted through the λ/4 phase shifter 109 and allowed to have an oscillation face parallel to the major axis of the dichroic dye 105. The polarized light component is absorbed in the dichroic dye 105, resulting in a substantially black image in the display. Meanwhile, under applied voltage, the liquid-crystal molecules 104a, as well as the dichroic dye 105, are aligned perpendicular to the electric-field direction. Light entering from the side of the upper substrate 102 is not absorbed in the dichroic dye 105 and transmitted through the guest-host liquid-crystal layer 104, and reflected by the reflective layer 108 without being polarized by the λ/4 phase shifter 109. The reflected light is re-transmitted through the λ/4 phase shifter 109 and emerges from the guest-host liquid-crystal layer 104 without being absorbed in the dichroic dye 105, thereby resulting in a white image in the display.

According to the above-mentioned structure shown in FIG. 6, a uniaxially aligned liquid-crystal polymer is used for the λ/4 phase shifter 109, and the alignment film 111 is formed thereon for orientating the guest-host liquid-crystal layer 104. For example, the alignment film 111 is formed by applying a polyimide resin dissolved in a solvent, followed by drying. However, when coated with the solvent containing an alignment material, liquid-crystal polymers are damaged because of their low solvent resistance and they lose optical uniaxial anisotropy. Therefore, the resulting λ/4 phase shifters cannot function satisfactorily.

SUMMARY OF THE INVENTION

In view of the above-mentioned problems

As a basic structure, a reflective guest-host liquid-crystal display of the present invention comprised: a first substrate positioned at an incident side; a second substrate positioned at a reflection side and joined with the first substrate with a predetermined space therebetween; a guest-host liquid-crystal layer which contains a dichroic dye and which is held within the space; a reflective layer provided at a side of the second substrate; a λ/4 phase shifter provided between the guest-host liquid-crystal layer and the reflective layer; and electrodes respectively formed on the first and second substrates so as to apply a voltage to guest-host liquid-crystal layer. The λ/4 phase shifter is composed of a uniaxially aligned side-chain type liquid-crystal polymer having at least a biphenyl benzoate group introduced into a side chain. In some cases, the side-chain type liquid-crystal polymer has a methoxybiphenyl group introduced into a side chain, in addition to the biphenyl benzoate group. Preferably, the methoxybiphenyl group is contained in the liquid-crystal polymer in an amount of not more than 50% of the total amount of the side chains. The side-chain type liquid-crystal polymer may have a trans-4-(4'methoxymethylcyclohexyl) methoxyphenyl benzoate group introduced into a side chain, in addition to the biphenyl benzoate group. Preferably, the trans-4-(4'methoxymethylcyclohexyl)methoxyphenyl benzoate group is contained in the liquid-crystal polymer in an amount of 20 to 50% of the total amount of the side chains.

According to the present invention, the λ/4 phase shifter exhibits excellent solvent resistance because it is composed of a uniaxially aligned side-chain type liquid-crystal polymer having at least a biphenyl benzoate group introduced into a side chain. In practice, the λ/4 phase shifter shows sufficient solvent resistance required to form an organic alignment film thereon, which organic alignment film aligns the guest-host liquid-crystal layer.

DESCRIPTION OF THE PREFERRED EMBODIMENT

The present invention will be better understood from the following description of the preferred embodiments taken in conjunction with the accompanying drawings.

Figure 1:
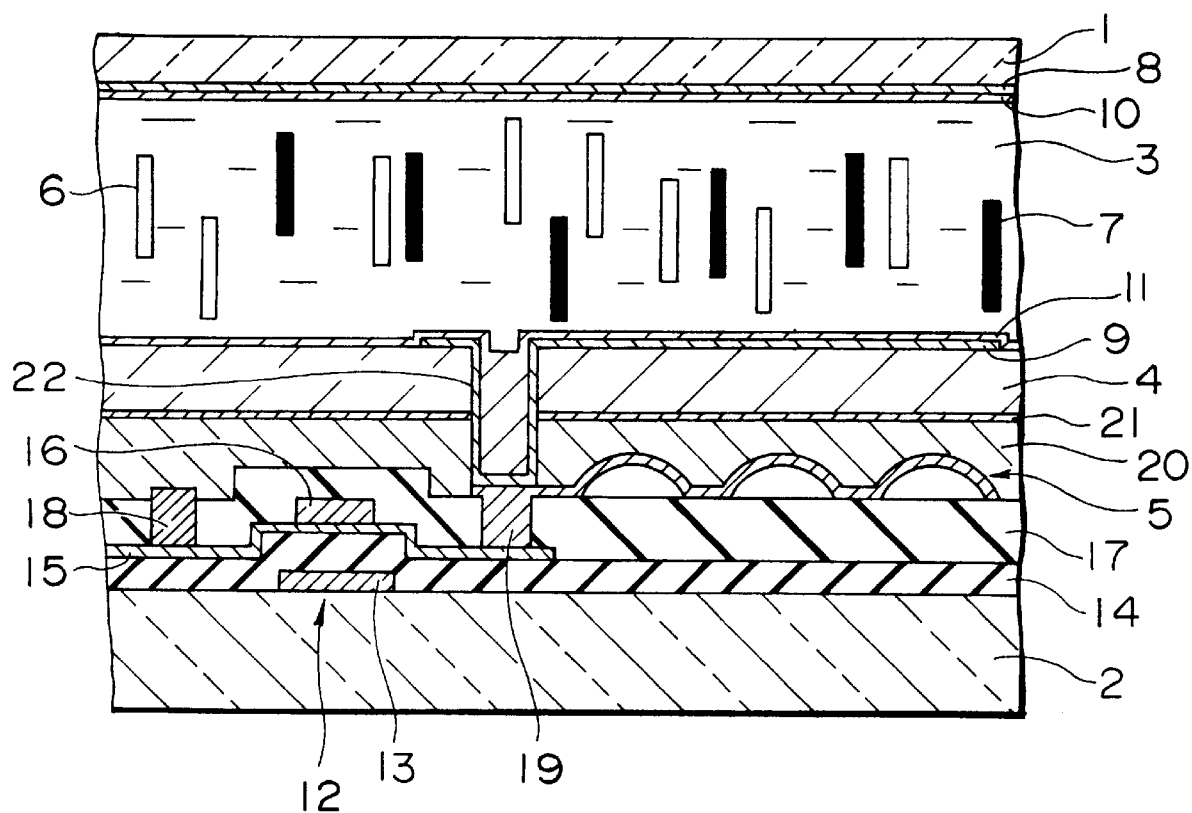
FIG. 1 is a fragmentary sectional diagram showing a basic structure of a reflective guest-host liquid-crystal display incorporated into the present invention.
Figure 6:
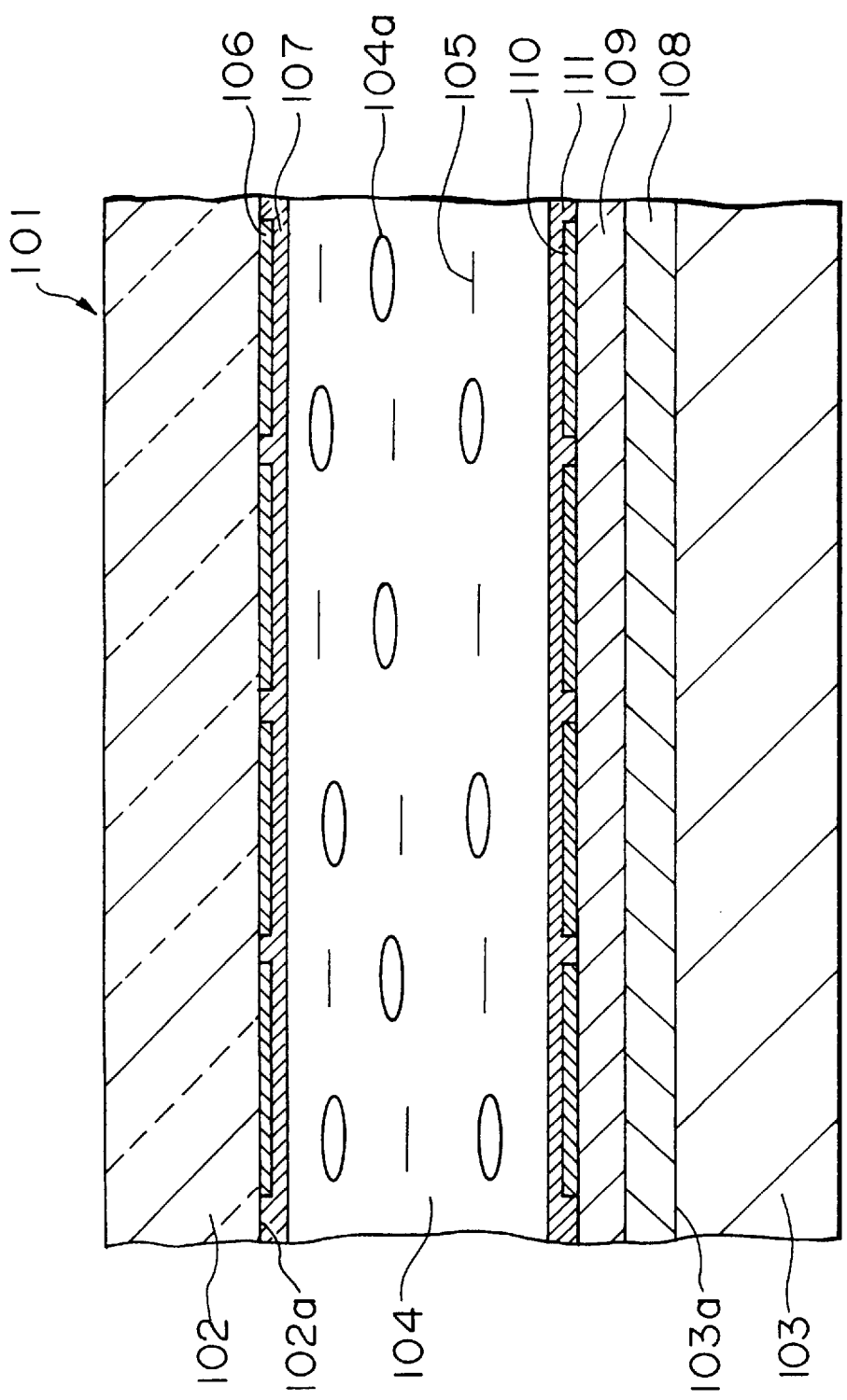
FIG. 6 is a fragmentary sectional diagram showing a conventional reflective guest-host liquid-crystal display.

FIG. 1 is a fragmentary sectional diagram showing a basic structure of a reflective guest-host liquid-crystal display incorporated into the present invention. The display is assembled such that a first substrate 1 positioned at the incident side and a second substrate 2 located at the reflection side are joined together with a predetermined space therebetween. At least a guest-host liquid-crystal layer 3, a $\lambda/4$ phase shifter 4, and a reflective layer 5 are provided within the space between the pair of first and second substrates 1 and 2. The guest-host liquid-crystal layer 3 is positioned adjacent to the first substrate 1 of the incident side and contains homeotropically aligned nematic liquid-crystal molecules 6 and a dichroic dye 7, in other words, the liquid-crystal molecules 6 are aligned such that their major axis is perpendicular to the substrate surface. Also within this space, the reflective layer 5 is provided adjacent to the second substrate 2 of the reflection side. The $\lambda/4$ phase shifter 4 is positioned between the guest-host liquid-crystal layer 3 and the reflective layer 5. For applying a signal voltage to the reflective guest-host liquid-crystal layer 3, a counter electrode 8 is formed on the inner surface of the first substrate 1 of the incident side and a pixel electrode 9 is provided on the inner surface of the second substrate of the reflection side. The surface of the counter electrode 8 and that of the pixel electrode 9 are covered with alignment films 10 and 11, respectively, so as to homeotropically align the guest-host liquid-crystal layer 3. The reflective guest-host liquid-crystal display is in a transmission state under no applied voltage, and it changes to a colored state when a voltage is applied. Although the guest-host liquid-crystal layer 3 is homeotropically aligned in this embodiment, it may be homogeneously oriented, as is shown in FIG. 6.

The reflective guest-host liquid-crystal display of this embodiment is an active-matrix type. For driving a pixel electrode 9 by switching, a thin-film transistor (hereinafter referred to as "TFT") 12 is integratedly formed on the second substrate 2 of the reflection side, as is shown in the figure. The TFT 12 has a bottom-gate structure such that a gate electrode 13, a gate insulating film 14, a semiconductor thin-film 15, and a stopper 16 are laminated from the bottom in the above given order. The TFT 12 is covered with an interlayer insulating film 17. A source electrode 18 and a drain electrode 19 are formed on the interlayer insulating film 17 by patterning, and electrically connected to the TFT 12 through the corresponding contact holes. The reflective layer 5 is also provided on the interlayer insulating film 17 by patterning and has the same electric potential as that of the drain electrode 19. The reflective layer 5 having a rough surface and the TFT 12 are covered with a planarization layer 20. The $\lambda/4$ phase shifter 4 is formed on the planarization 20 with an undercoat alignment layer 21 therebetween. Furthermore, the pixel electrode 9 patterned on the $\lambda/4$ phase shifter 4 electrically connects to the drain electrode 12 through the contact hole 22 penetrating the $\lambda/4$ phase shifter 4 and the planarization layer 20. For example, the contact hole 22 can be made by a photolithographic process and an etching process using a positive photoresist. In addition, the alignment film 11 is prepared by applying a solution containing an alignment material, such as polyimide, to the surface of the pixel electrode 9 and that of the $\lambda/4$ phase shifter 4.

The present invention is characterized in that the $\lambda/4$ phase shifter 4 is composed of a uniaxially aligned side-chain type liquid-crystal polymer having at least the biphenyl benzoate groups introduced into side chains. The side-chain type liquid-crystal polymer may have the methoxybiphenyl groups introduced into side chains, in addition to the biphenyl benzoate groups. In such a case, the methoxybiphenyl groups are preferably contained in the side-chain type liquid-crystal polymer in an amount of not more than 50% of the total amount of the side chains. The side-chain type liquid-crystal polymer may have the trans-4-( 4'methoxymethylcyclohexyl)methoxyphenyl benzoate groups introduced into side chains, in addition to the biphenyl benzoate groups. In such a case, the trans-4-(4'methoxymethylcyclohexyl)methoxyphenyl benzoate groups are preferably contained in the liquid-crystal polymer in an amount of 20 to 50% of the total amount of the side chains. Solvent resistance of the $\lambda/4$ phase shifter 4 can be remarkably improved by using side-chain type liquid-crystal polymers having the above-mentioned compositions. Thus, the $\lambda/4$ phase shifter 4 is not solubilized or damaged to lose its uniaxial alignment even when a photoresist is applied to the surface of the $\lambda/4$ phase shifter 4 for making the contact hole 22, or when an organic alignment film 11 is applied to the surface.

Figure 2:
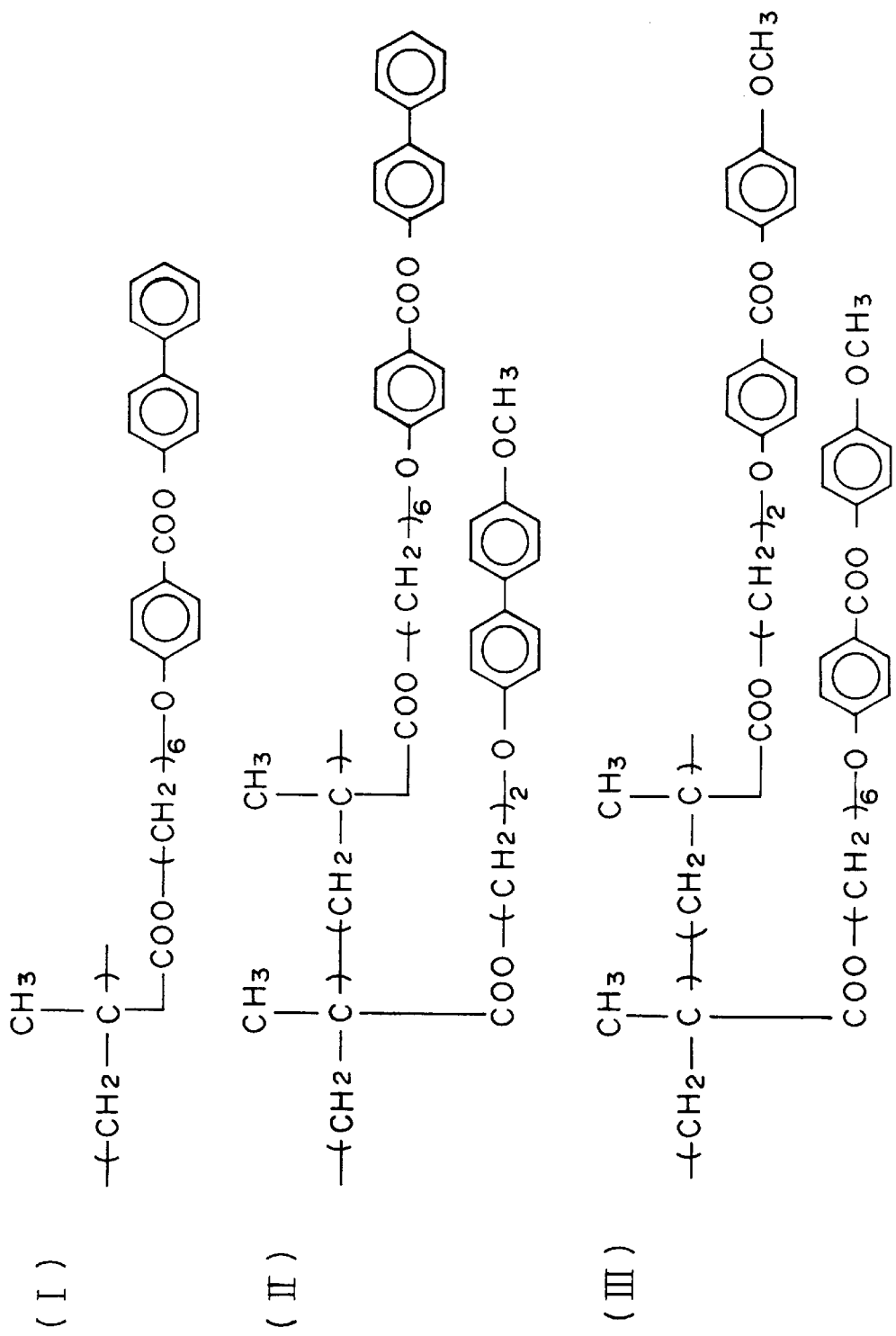
FIG. 2 shows chemical structures of side-chain type liquid-crystal polymers each can be used for preparing a $\lambda/4$ phase shifter of a reflective guest-host liquid-crystal display.

FIG. 2 shows chemical structures of the side-chain type liquid-crystal polymers. The liquid-crystal polymer of chemical structure (I) has the biphenyl benzoate groups introduced into side chains. Side chains are bonded to the main alkyl chain at certain intervals (just one side chain is shown in the figure). Although the length of the side chain of the liquid-crystal polymer of chemical structure (I) corresponds to six carbon atoms, the present invention is not restricted to this length. The biphenyl benzoate group is bonded to the end of the side chain.

The liquid-crystal polymer of chemical structure (II) has the methoxybiphenyl groups introduced into side chains, in addition to the biphenyl benzoate groups. Although the length of the side chain having the methoxybiphenyl group corresponds to two carbon atoms, the present invention is not restricted to this length. Both of the liquid-crystal polymers of the chemical structures (I) and (II) exhibit excellent solvent resistance.

Meanwhile, the liquid-crystal polymer of chemical structure (III) having methoxybiphenyl groups introduced into side chains is shown as a reference. In this case, a side chain having a length of two carbon atoms and that having a length of six carbon atoms are bonded to the main chain. The liquid-crystal polymer of chemical structure (III) shows inferior solvent resistance to those of the liquid-crystal polymers of the chemical structures (I) and (II). Therefore, when the liquid-crystal polymer of chemical structure (III) is used for the λ/4 phase shifter 4 shown in FIG. 1, the resulting λ/4 phase shifter 4 is damaged by a solvent of the organic alignment film 11 and loses its optical uniaxial anisotropy. In addition, the λ/4 phase shifter 4 may be damaged by a solvent of a photoresist used for making the contact hole 22. To prevent the above damage, for example, it is necessary to coat the surface of the λ/4 phase shifter 4 with a buffer layer made of an acrylic resin or the like, which fact results in the following disadvantages: an extra process is required for forming the buffer layer; it becomes difficult to electrically connect the pixel electrode 9 to the drain electrode 19 because the contact hole 22 is made deeper corresponding to the thickness of the buffer layer; and the image in the liquid-crystal display becomes dark due to light absorption by the buffer layer. When the liquid-crystal polymer of chemical structure (I) or (II) having superior solvent resistance is used for the λ/4 phase shifter 4, the buffer layer is not required. The above disadvantages are thus solved completely.

Figure 3A:
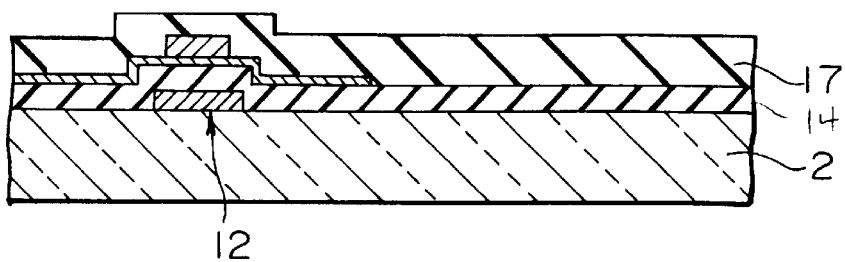
FIGS. 3A to 3D show steps for manufacturing a reflective guest-host liquid-crystal display shown in FIG. 1.
Figure 3B:
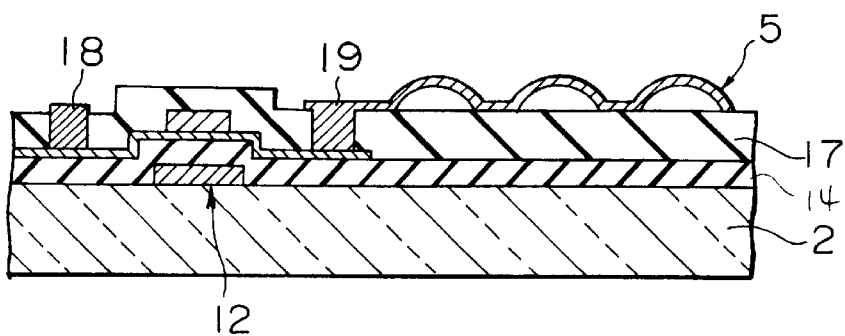
Figure 3C:
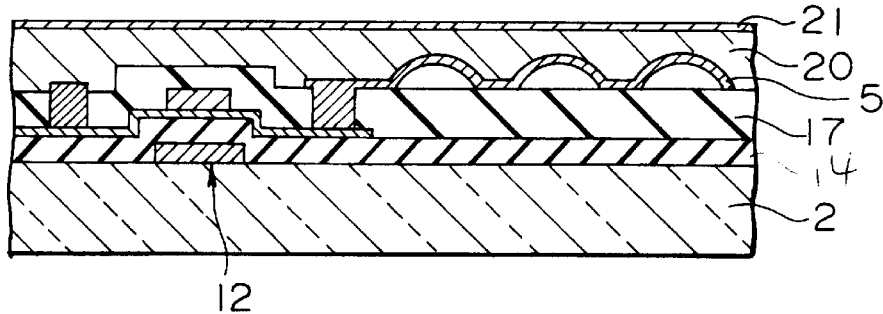
Figure 3D:
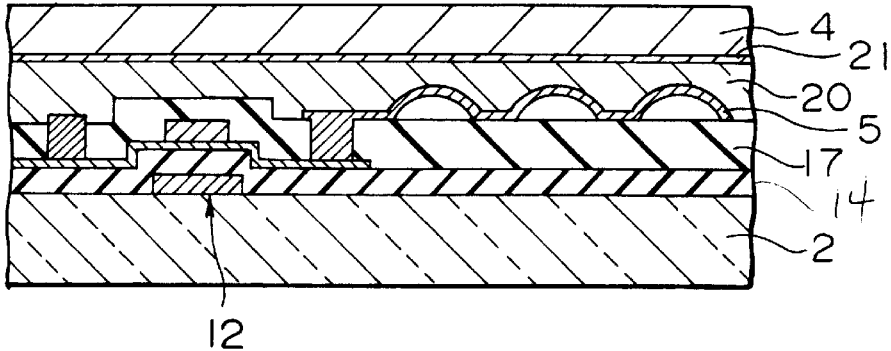

A method for manufacturing the reflective guest-host liquid-crystal display shown in FIG. 1 will be explained in detail with reference to FIGS. 3A to 3D and FIGS. 4E to 4H. First, a TFT 12 is integratedly formed on an insulating substrate 2 in step A as shown in FIG. 3A. The TFT 12 is covered with an interlayer insulating film 17. In step B of FIG. 3B, a reflective layer 5 is formed on the interlayer insulating layer 17. The surface of the reflective layer 5 is uneven so that it scatters light to provide a so-called white-paper tone in the display. Simultaneously, a source electrode 18 and a drain electrode 19, both of which connect to the TFT 12, are formed by patterning. In step C of FIG. 3C, a planarization layer 20 is prepared from a transparent acrylic resin for covering the reflective layer 5 having the uneven surface and the TFT 12. An undercoat alignment layer 21 is provided on the surface of the planarization layer 20. The undercoat alignment layer 21 is, for example, a rubbed polyimide film and it achieves the desired uniaxial alignment in a λ/4 phase shifter. In step D of FIG. 3D, a λ/4 phase shifter 4 is formed on the undercoat alignment layer 21. As is mentioned above, the λ/4 phase shifter 4 is composed of the liquid-crystal polymer of chemical structure (I) or (II) of FIG. 2 and exhibits excellent solvent resistance.

Figure 4E:
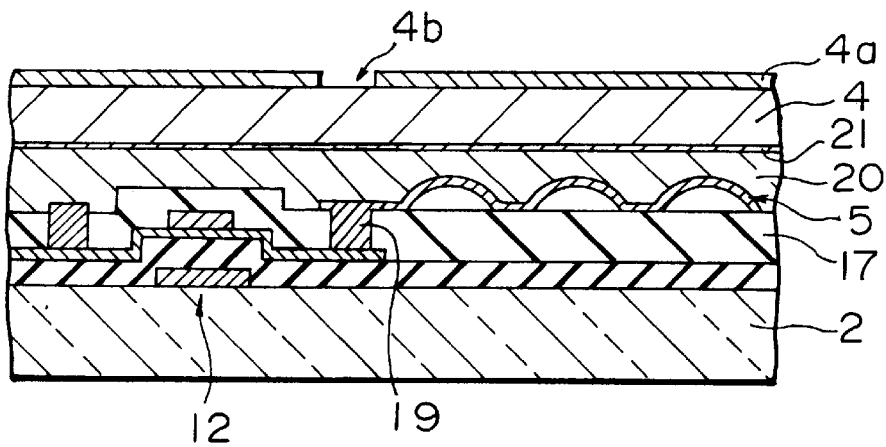
FIGS. 4E to 4H show steps for manufacturing a reflective guest-host liquid-crystal display shown in FIG. 1.
Figure 4F:
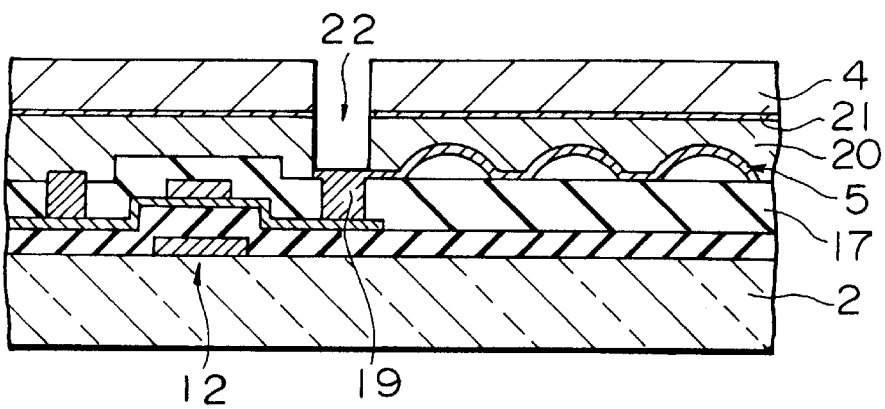
Figure 4G:
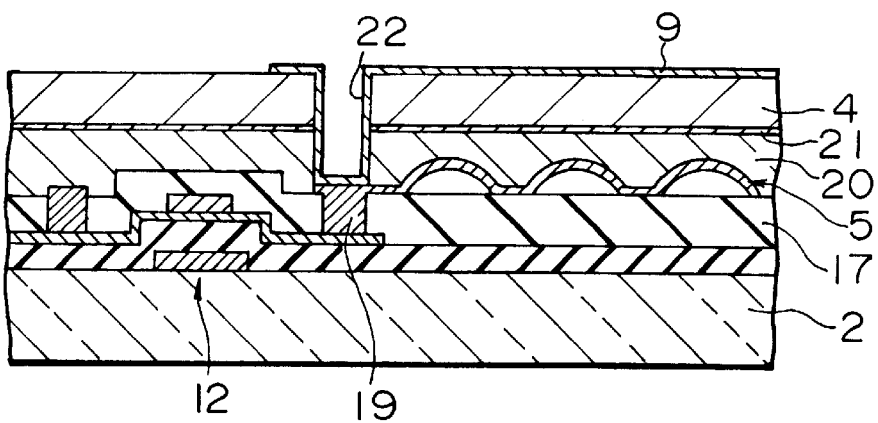
Figure 4H:
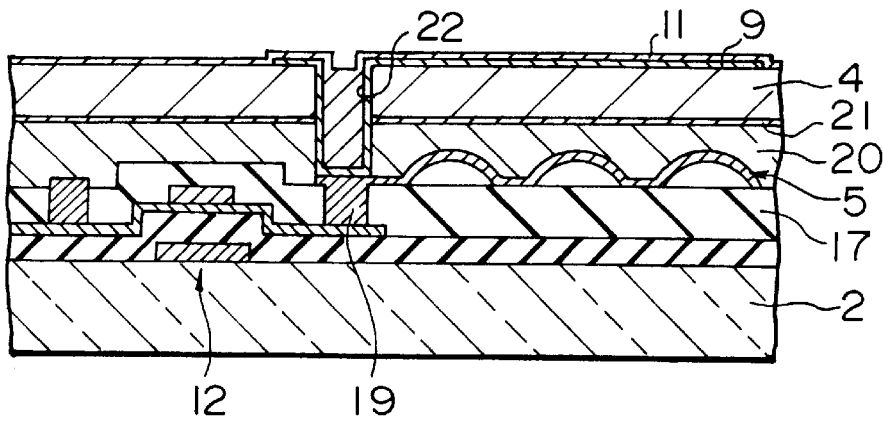

In step E of FIG. 4E, for example, a positive photoresist 4a is applied to the surface of the λ/4 phase shifter 4. A window 4b matching the drain electrode 19 is made by subjecting the photoresist 4a to light-exposure and development. Since the λ/4 phase shifter 4 has sufficient solvent resistance, it is not solubilized by a solvent contained in the photoresist 4a. In step F of FIG. 4F, a contact hole 22 penetrating the λ/4 phase shifter 4, the undercoat alignment layer 21, and the planarization layer 20 to the drain electrode 19 is made by etching while using the patterned photoresist 4a as a mask. For etching in step F, wet-etching using an organic solvent or dry-etching by oxygen-plasma radiation can be employed. In step G of FIG. 4G, a transparent conductive film such as an ITO film is formed on the surface of the λ/4 phase shifter 4. The transparent conductive film is then patterned into a pixel electrode 9 such that the pixel electrode 9 is connected to the drain electrode 19 of the TFT 12 through the contact hole 22. Since an inorganic etching solution is used for patterning the transparent conductive film, the λ/4 phase shifter 4 is not damaged by the above procedure. Finally, in step H of FIG. 4H, an organic alignment film 11 is applied to the surface of the pixel electrode 9 and the exposed surface of the λ/4 phase shifter. In practice, an alignment material solution prepared by dissolving polyimide is applied and dried to form the alignment film 11. Since the liquid-crystal polymer composing the λ/4 phase shifter 4 has sufficient solvent resistance, it is not solubilized by a solvent contained in the alignment material solution. An incident-side substrate 1 having a counter electrode and an alignment film thereon is then joined with the substrate 2 of the reflection side with a predetermined space therebetween. A guest-host liquid-crystal is poured into this space to complete the reflective guest-host liquid-crystal display shown in FIG. 1.

Figure 5A:
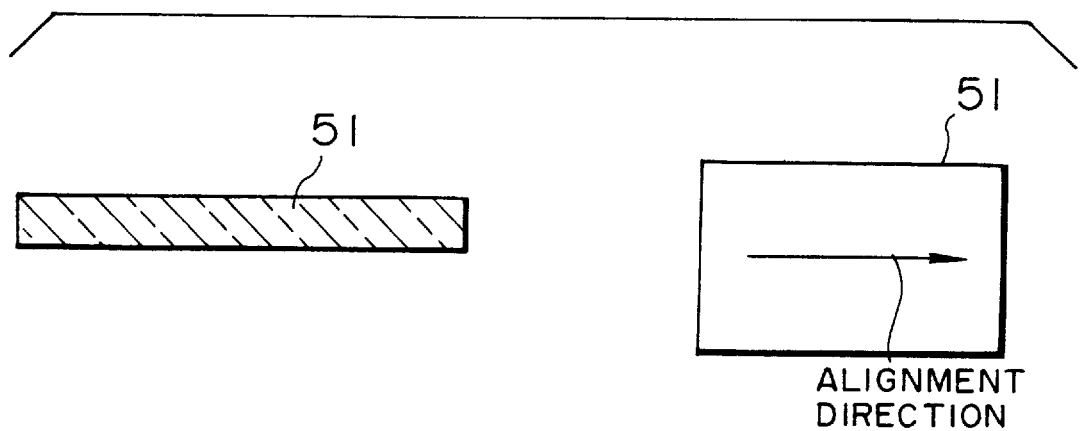
FIG. 5A shows a step for preparing $\lambda/4$ phase shifter.
Figure 5B:
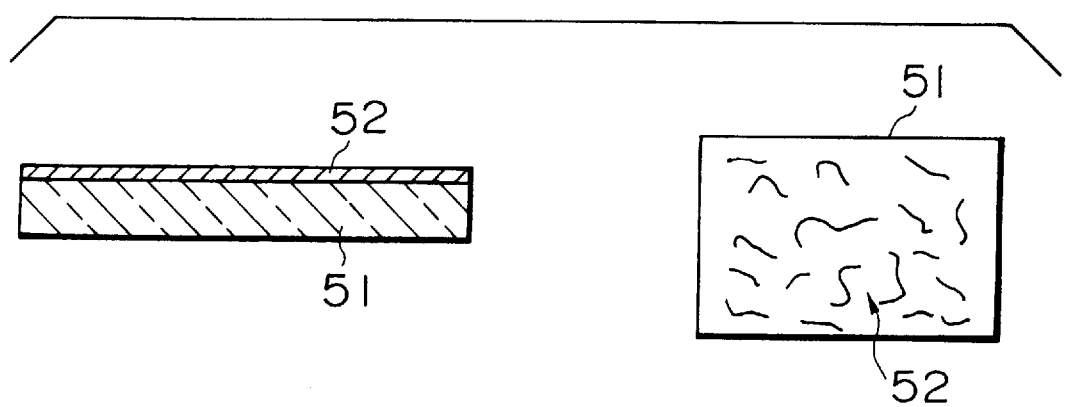
FIG. 5B shows a step for preparing a $\lambda/4$ phase shifter.
Figure 5C:
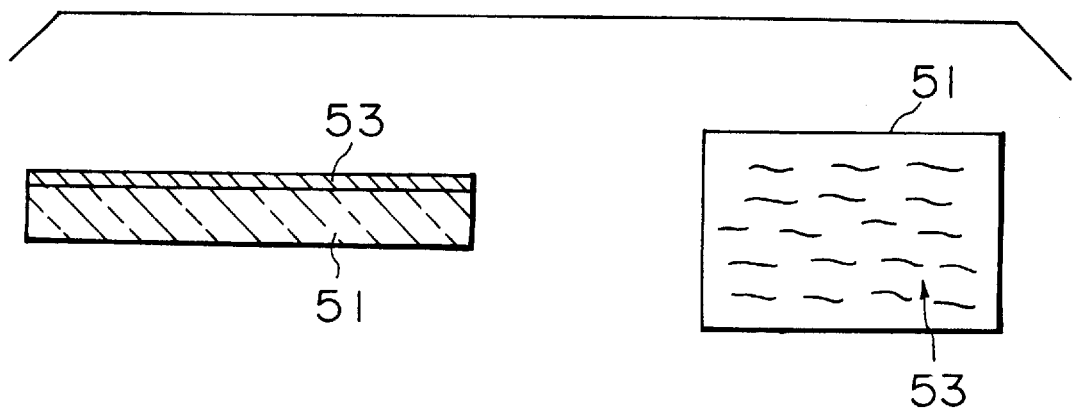
FIG. 5C shows a step for preparing a $\lambda/4$ phase shifter.

A method for preparing a λ/4 phase shifter will be described in detail with reference to FIG. 5. For easier understanding, a case of directly forming a λ/4 phase shifter on a substrate surface is shown in FIG. 5. First, the alignment step (A) is carried out as follows: The surface of a substrate 51 made of an insulating material such as glass or quartz is aligned in a predetermined direction. For example, a polyimide film is formed on the surface of a substrate 51 and then orientated by rubbing in the alignment direction. In some cases, the surface of the substrate 51 may be directly rubbed. The film-forming step (B) is carried out by coating the substrate 51 with a side-chain type liquid-crystal polymer 52 to a predetermined thickness. In this embodiment, the liquid-crystal polymer 52 is the side-chain type liquid-crystal polymer of chemical structure (I) of FIG. 2 and has the biphenyl benzoate groups introduced into side chains. The side-chain type liquid-crystal polymer of chemical structure (I) shows phase transition between the liquid phase in a temperature range higher than a certain transition point and the liquid-crystal phase in a temperature range lower than the transition point. The liquid-crystal polymer of chemical structure (I) is dissolved in an appropriate solvent and applied to the aligned surface of the substrate 51 by spin-coating, wire-coating, printing, or the like. For example, a mixture of cyclohexane and methyl ethyl ketone (MEK) at a ratio of 8:2 can be used as a solvent. In the case of spin-coating, the concentration of the solution and the spinning rate are appropriately set so that the resulting film has a thickness producing λ/4 (λ indicates the wavelength of incident light) phase difference in the visible-light region. The substrate 51 is then subjected to heat-drying for evaporating the solvent contained in the solution of the liquid-crystal polymer 52. Finally, in the temperature treatment step (C), the substrate 51 is once heated above the transition point and then slowly cooled to room temperature, i. e., below the transition point. The liquid-crystal polymer 52 is thereby aligned to form a λ/4 phase shifter 53. The resulting λ/4 phase shifter 53 is a uniaxially aligned optical thin-film. In some cases, the desired uniaxial alignment can be achieved by leaving the film-formed liquid-crystal polymer 52 in the liquid-crystal phase for a certain period of time. As is shown in the figure, side chains of liquid-crystal molecules contained in the liquid-crystal polymer 52 are randomly aligned in the film-forming step (B), meanwhile they are oriented in a certain alignment direction after the temperature-treatment step (C), resulting in the desired uniaxial optical anisotropy. The λ/4 phase shifter 54 made of the liquid-crystal polymer of chemical structure (I) exhibits excellent solvent resistance with respect to the positive photoresist 4a shown in FIG. 4E or the organic alignment film 11 shown in FIG. 4H. For example, up to approximately 60° C. the λ/4 phase shifter 53 is not solubilized by a positive photoresist containing ethyl lactate or butyl acetate as a solvent. With respect to a solution prepared by dissolving polyimide in n-methylpyrrolidone (NMP), the λ/4 phase shifter 53 is not solubilized up to approximately 35° C. Therefore, in step E of FIG. 4E, the photoresist 4a can be directly formed on the λ/4 phase shifter 4 without a buffer layer by drying a positive photoresist solution at a temperature of not more than 60° C. after coating. Furthermore, in step H shown in FIG. 4H, the organic alignment film 11 can be directly formed on the λ/4 phase shifter 4 without a buffer layer when a solvent of the organic alignment material solution is sufficiently evaporated, for example, by baking at 30° C. in a vacuum after coating. In addition, for further accelerating solvent evaporation, an alignment film which has been sufficiently baked in a vacuum at a low temperature can be subjected to high-temperature baking at approximately 100° C.

Similarly to the liquid-crystal polymer of chemical structure (I), the liquid-crystal polymer of chemical structure (II) of FIG. 2 can be formed as a film according to a method shown in FIG. 5. However, when the liquid-crystal polymer of chemical structure (II) having the methoxybiphenyl groups introduced into side chains in addition to the biphenyl benzoate groups is used as a liquid-crystal polymer material, the characteristics of the material largely depend on the ratio of the methoxybiphenyl groups and the biphenyl benzoate groups in the copolymer. For example, when the amount of the methoxybiphenyl groups is more than approximately 70% of the total amount of the side chains of a polymer whose molecular weight is approximately 20,000, a region appears in which the pre-tilt angle of the liquid-crystal polymer remarkably increases and exceeds 60°. Furthermore, when the amount of the methoxybiphenyl groups is 80% or more, the liquid-crystal polymer becomes slightly soluble or insoluble in cyclohexane and MEK, which fact means that a highly toxic halogen solvent (e.g., 1,1,2,2-tetrachloroethane), phenol, or the like must be employed. Therefore, in practice, the amount of the methoxybiphenyl groups is preferably 50% or less of the total amount of the side chains of the polymer. When the amount of the methoxybiphenyl groups is 50% or less, the solubilization temperature with respect to the positive photoresist is raised according to an increase in the amount of the methoxybiphenyl group, meanwhile the solubilization temperature with respect to the organic alignment material solution is lowered. For example, when the amount of the methoxybiphenyl group is 50%, the resulting λ/4 phase shifter is insoluble in the positive resist up to approximately 100° C., meanwhile it is insoluble in the organic alignment material solution only in a temperature range of not more than 22° C. Therefore, it becomes possible to bake a positive resist at a high temperature (e.g., at 100° C.) without a vacuum-baking process. Moreover, concerning the organic alignment material solution, film-forming can be carried out without complication such that the film is baked in a vacuum at 15° to 18° C. for 4 hours followed by baking at 100° C.

Figure 7:
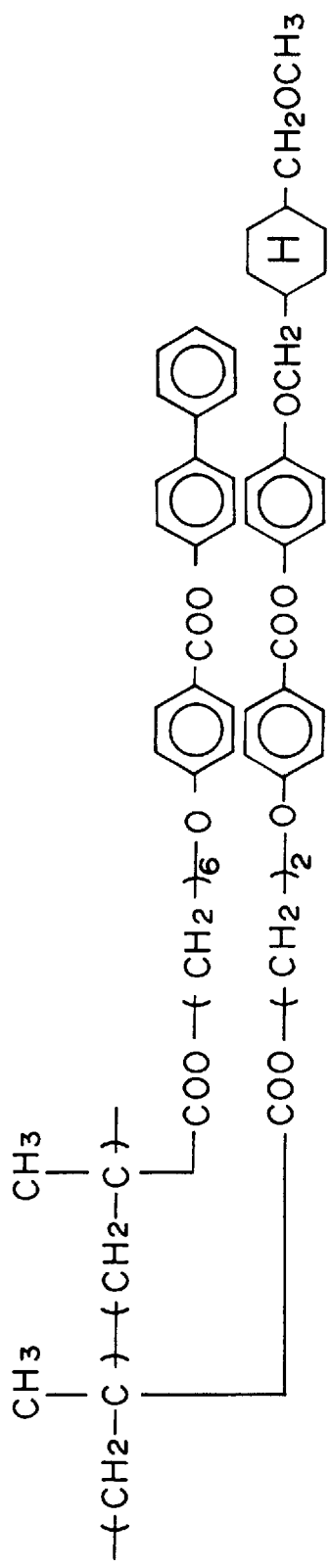
FIG. 7 shows a chemical structure of another side-chain type liquid-crystal polymer which can be used for preparing a $\lambda/4$ phase shifter of a reflective guest-host liquid-crystal display.

FIG. 7 is a diagram showing a chemical structure of a side-chain type liquid-crystal polymer of another embodiment incorporated in the present invention. This liquid-crystal polymer of chemical structure (IV) has the trans-4-(4'methoxymethylcyclohexyl)methoxyphenyl benzoate groups introduced into side chains, in addition to the biphenyl benzoate groups. The preferred amount of the trans-4-(4'methoxymethylcyclohexyl)methoxyphenyl benzoate groups is 20 to 50% of the total amount of the side chains. As is apparent from a comparison between FIGS. 7 and 2, the liquid-crystal polymer of chemical structure (VI) is prepared by introducing the trans-4-(4'methoxymethylcyclohexyl)methoxyphenyl benzoate groups into the side chains, instead of the methoxybiphenyl groups introduced into the side chains in the liquid-crystal polymer of chemical structure (II). As is mentioned above, the reference liquid-crystal polymer of chemical structure (III) has the methoxyphenyl benzoate groups in side chains. However, since the liquid-crystal polymer of chemical structure (III) is soluble in the polyimide solution used as an alignment material solution for the guest-host liquid-crystal layer, the resulting λ/4 phase shifter must be protected by an acrylic resin or the like. Thus, the following problems occur: an extra process is required for forming a protective layer, a decrease occurs in transmittance, patterning of the contact holes deteriorates, and the like. In addition, the transition point between the solid phase (glass phase) and the liquid-crystal phase is as low as 68.5° C., and the processing temperatures in the succeeding steps must be below this transition point. For solving the above problems, the liquid-crystal polymers of chemical structures (I) and (II) shown in FIG. 2 have been developed. As is mentioned above, the liquid-crystal polymer of chemical structure (I) has the biphenyl benzoate groups introduced into side chains, and the liquid-crystal polymer of chemical structure (II) has the methoxy biphenyl groups, in addition to the biphenyl benzoate groups, introduced into side chains. The solvent resistance of the liquid-crystal polymers were remarkably improved by introducing at least the biphenyl benzoate groups into side chains. However, in some cases, the liquid-crystal polymers of chemical structures (I) and (II) are not easily used in practice because their transition points between the glass phase and the liquid-crystal phase are at approximately 110° C., which temperature is still low to the point that the processing temperatures in the succeeding steps are limited. For example, only ultraviolet-curing adhesives can be used as a sealant for laminating a pair of glass substrates. The liquid-crystal polymers of chemical structures (I) and (II) transit from the glass phase to the smectic liquid-crystal phase at first, then to the nematic liquid-crystal phase, and finally to the liquid phase (isotropic phase). Thus, the range of the transition temperature of the liquid-crystal phase is wide, and changes in retardation occur from 80° to 90° C. Retardation is determined by the product of the λ/4 phase shifter thickness and the refractive-index anisotropy, and it largely affects the polarization and transformation functions of the λ/4 phase shifter.

Therefore, in this embodiment, the liquid-crystal polymer of chemical structure (IV) shown in FIG. 7 is employed for the λ/4 phase shifter to further improve the characteristics of the liquid-crystal polymers of chemical structures (I) and (II) while maintaining their advantages. As is described above, the liquid-crystal polymer of chemical structure (IV) is prepared by introducing the trans-4-(4'methoxymethylcyclohexyl)methoxyphenyl benzoate groups, in addition to the biphenyl benzoate groups, into side chains. According to this embodiment, the length of the side chain having the biphenyl benzoate group is six carbon atoms and that of the side chain having the trans-4-(4'methoxymethylcyclohexyl)methoxyphenyl benzoate group is two carbon atoms. The liquid-crystal polymer of chemical structure (IV) has a higher transition point (129.4° C.) between the glass phase and the liquid-crystal phase as compared with those of the liquid-crystal polymers of chemical structures (I) and (II), allowing a processing temperature of approximately 120° C. Therefore, adhesives more reliable than the ultraviolet-curing adhesives can be used as a sealant for laminating a pair of glass substrates in the succeeding step. For example, an adhesive hardened by a combination of ultraviolet radiation and heating can be used. Thermosetting adhesives also can be used. Furthermore, different from the liquid-crystal polymers of chemical structures (I) and (II), the liquid-crystal polymer of chemical structure (IV) directly transits from the glass phase to the nematic liquid-crystal phase without passing through the smectic liquid-crystal phase. Therefore, reliable optical characteristics with a narrow phase-transition temperature range can be expected.

Although the liquid-crystal polymer of chemical structure (IV) of FIG. 7 is prepared by introducing the biphenyl benzoate groups and the trans-4-(4'methoxymethylcyclohexyl)methoxyphenyl benzoate groups into side chains of the alkyl main chain at a ratio of 1 to 1, the ratio can be appropriately changed. However, when the amount of the trans-4-(4'methoxymethylcyclohexyl)methoxyphenyl benzoate groups is 20% or less of the total amount of the side chains, the smectic liquid-crystal phase appears. Meanwhile, the alignment properties decrease when the amount of the trans-4-(4'methoxymethylcyclohexyl)methoxyphenyl benzoate groups is 50% or more. Thus, the preferred amount of the trans-4-(4'methoxymethylcyclohexyl)methoxyphenyl benzoate group is 20% to 50% of the total amount of the side chains.

Similar to the liquid-crystal polymers of chemical structures (I) and (II), the liquid-crystal polymer of chemical structure (IV) exhibits excellent solvent resistance and is formed into a $\lambda/4$ phase shifter according to the steps shown in FIGS. 3 and 4. In practice, the liquid-crystal polymer of chemical structure (IV) is dissolved in an appropriate solvent such as a mixture of cyclohexane and MEK at a ratio of 8:2. The coating solution is applied to the aligned surface of a substrate by spin-coating, wire-coating, printing, or the like. The substrate is then baked at a temperature sufficient for evaporating the solvent. Excellent alignment can be achieved in the $\lambda/4$ phase shifter by slowly cooling the liquid-crystal polymer from the liquid phase to the glass phase or by leaving in the liquid-crystal phase for a certain period of time. The $\lambda/4$ phase shifter made of the liquid-crystal polymer of chemical structure (IV) is not solubilized up to approximately 60° C. by a positive photoresist used for patterning the $\lambda/4$ phase shifter. The positive photoresist contains ethyl sulfate or butyl acetate as a solvent. In addition, up to approximately 35° C., the liquid-crystal polymer is insoluble in a polyimide solution used as an alignment material for the guest-host liquid-crystal layer. The polyimide solution mainly employs NMP as a solvent. A polyimide alignment film aligning the guest-host liquid-crystal layer can be directly formed on the $\lambda/4$ phase shifter without a protective layer (buffer layer) as follows: the coated polyimide solution is baked in a vacuum at a temperature below the solubilization temperature of the liquid-crystal polymer (e.g., 30° C.) for sufficiently evaporating the solvent, followed by further baking at approximately 100° C.

As is described above, in a guest-host liquid-crystal display with $\lambda/4$ phase shifter and reflective layer of the present invention, the $\lambda/4$ phase shifter is composed of a uniaxially aligned side-chain type liquid-crystal polymer having at least the biphenyl benzoate groups introduced into side chains. Solvent resistance of the $\lambda/4$ phase shifter is thereby remarkably improved so that a photoresist or an organic alignment film can be directly formed on the $\lambda/4$ phase shifter without providing a buffer layer therebetween.

Thus, the guest-host liquid-crystal display with $\lambda/4$ phase shifter and reflective layer can be reliably manufactured by a simplified process. Display brightness is also improved because no buffer layer is required. Solvent resistance of the $\lambda/4$ phase shifter with respect to a photoresist is further improved by introducing the methoxy biphenyl groups in addition to the biphenyl benzoate groups. Moreover, the phase-transition temperature can be raised by introducing the trans-4-(4'methoxymethylcyclohexyl)methoxyphenyl benzoate group into side chains, in addition to the biphenyl benzoate groups.

What is claimed is:

1. A reflective guest-host liquid-crystal display comprising:

a first substrate positioned at an incident side;

a second substrate positioned at a reflection side and joined with said first substrate with a predetermined space therebetween;

a guest-host liquid-crystal layer hold within said space and containing a dichroic dye;

a reflective layer provided at a side of said second substrate;

a $\lambda/4$ phase shifter provided between said guest-host liquid-crystal layer and said reflective layer, said $\lambda/4$ phase shifter being composed of a uniaxially aligned liquid-crystal polymer, said liquid-crystal polymer having at least a biphenyl benzoate group introduced into a side chain; and electrodes respectively formed on said first and second substrates.

2. A reflective guest-host liquid-crystal display as set forth in claim 1, wherein said liquid-crystal polymer has a methoxybiphenyl group introduced into a side chain.

3. A reflective guest-host liquid-crystal display as set forth in claim 2, wherein said methoxybiphenyl group is contained in said liquid-crystal polymer in an amount of not more than 50% of the total amount of the side chains.

4. A reflective guest-host liquid-crystal display as set forth in claim 1, wherein said liquid-crystal polymer has a trans-4-(4'methoxymethylcyclohexyl)methoxyphenyl benzoate group introduced into a side chain.

5. A reflective guest-host liquid-crystal display as set forth in claim 4, wherein said trans-4-(4'methoxymethylcyclohexyl) methoxyphenyl benzoate group is contained in said liquid-crystal polymer in an amount of 20 to 50% of the total amount of the side chains.

6. A reflective guest-host liquid-crystal display as set forth in claim 1, wherein said $\lambda/4$ phase shifter has sufficient solvent resistance required to form an organic alignment film thereon, which organic alignment film aligns said guest-host liquid-crystal layer.

7. A reflective guest-host liquid-crystal display as set forth in claim 1, wherein said $\lambda/4$ phase shifter has a contact hole connecting to a switching device formed on said second substrate.

8. A reflective guest-host liquid-crystal display as set forth in claim 1, wherein said reflective layer has a scattering reflective face.

9. A reflective guest-host liquid-crystal display as set forth in claim 1, further comprising a planarization layer to compensate for the unevenness of both said switching device and said reflective layer.

10. A reflective guest-host liquid-crystal display as set forth in claim 1, wherein said electrodes are composed of a counter electrode formed on the entire inner surface of said first substrate and a plurality of pixel electrodes formed into a matrix pattern on said second substrate.

* * * * *